F. J. & M. HOFFELT.
SHADE BRACKET.
APPLICATION FILED APR. 20, 1915.
1,153,385. Patented Sept. 14, 1915.
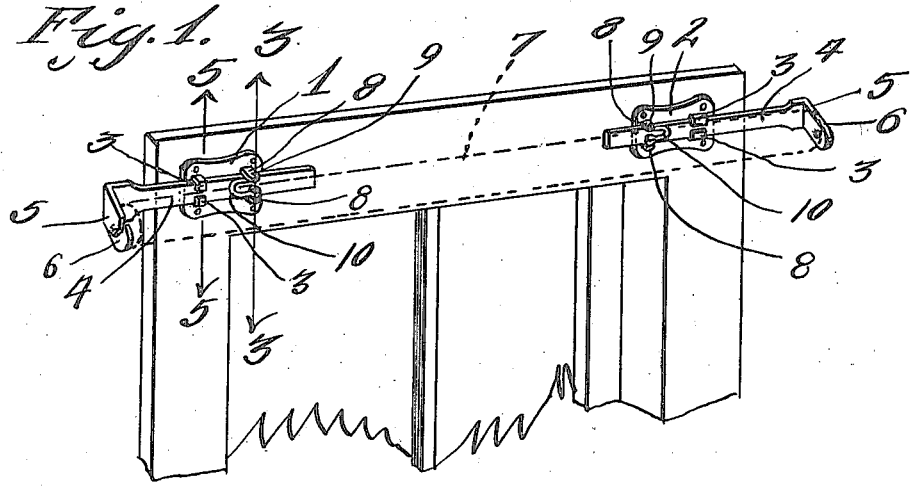
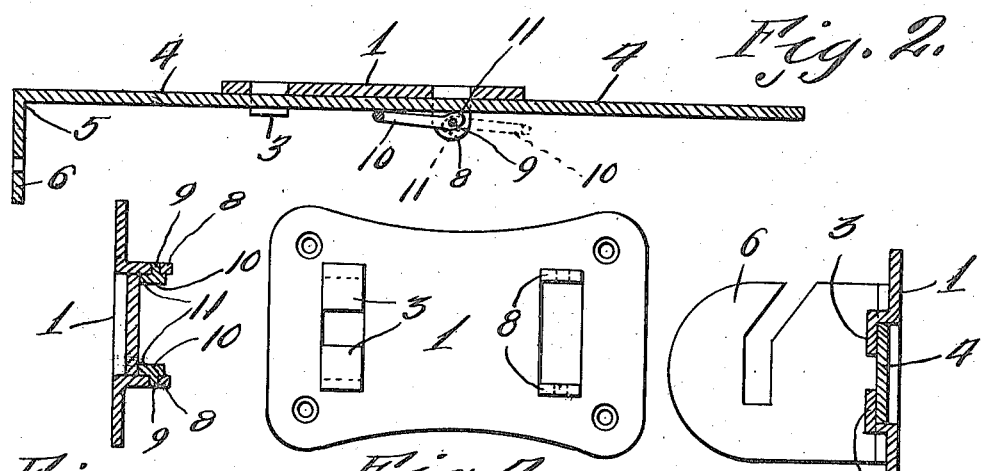
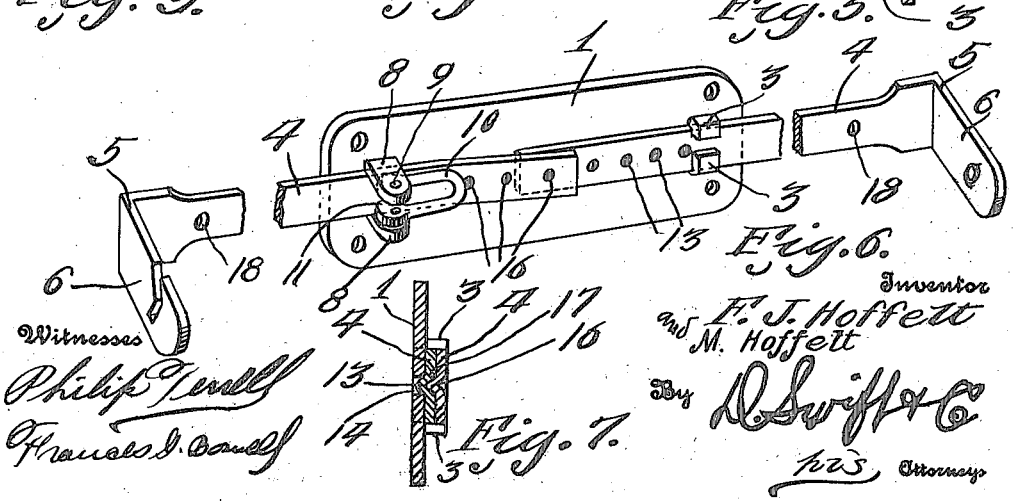

UNITED STATES PATENT OFFICE.

FRANK J. HOFFELT AND MICHEL HOFFELT, OF SPRINGFIELD, MISSOURI.

SHADE-BRACKET.

1,153,385.  Specification of Letters Patent.  Patented Sept. 14, 1915.

Application filed April 20, 1915. Serial No. 22,669.

*To all whom it may concern:*

Be it known that we, FRANK J. HOFFELT and MICHEL HOFFELT, citizens of the United States, residing at Springfield, in the county of Greene and State of Missouri, have invented a new and useful Shade-Bracket; and we do hereby declare the following to be a full, clear, and exact description of the invention, such as will enable others skilled in the art to which it appertains to make and use the same.

This invention relates to an improved shade roller bracket or support, and an object of the invention is to provide an adjustable shade bracket for supporting different lengths of rollers.

Another object of the invention is the provision of a single plate for adjustably holding and clamping both end parts of the bracket, so as to receive and hold rollers of different lengths.

One of the features of the invention is the provision of a single plate having struck up ears, between which and the plate the shank of one of the end brackets is received, said shank having lugs to engage openings of the plate, which lugs are held in such openings by the shank of the other bracket overlying and clamping the first shank, there being a lever clamp to hold the second shank in position, thereby clamping the two brackets in place.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective, showing two plates, one for each bracket. Fig. 2 is a longitudinal sectional view of one of the plates, showing the shank of one of the brackets adjustably held in place. Fig. 3 is a cross sectional view on line 3—3 of Fig. 1. Fig. 4 is a detail view of one of the plates. Fig. 5 is a sectional view on line 5—5 of Fig. 2. Fig. 6 is a perspective view showing a single plate adjustably holding and clamping both brackets, one having interengaging lugs and openings with the plate, the shank of the other bracket overlapping the shank of the first bracket, there being a lever clamp to hold the shank of the second bracket in place. Fig. 7 is a transverse sectional view of Fig. 6, where the shanks overlap each other.

Referring more particularly to the drawings, 1 and 2 designate two plates, each of which is of the shape shown and provided with struck up lugs or ears 3 extending toward each other and designed to overlie the shank 4 of the bracket 5 which is provided with an ear 6 to receive the pintle of one end of the shade roller 7 shown in dotted lines. Each plate adjacent its other end is provided with additional struck up ears or lugs 8 extending laterally from the plate, and mounted in bearings of the ears 8 are the pivot pintles 9 of the U-shaped lever clamp 10. The arms of the U-shaped lever clamp adjacent the pivot pintles thereof are formed eccentrically or constructed with projections 11 eccentric to the pivot pintles, to cam or frictionally engage against each shank 4, to hold the shank adjustably in position. These eccentric projections are so constructed on the arms of the U-shaped lever, that when the lever is thrown to the position shown in Fig. 1, said projections act to firmly engage the shank in such wise as to draw the bracket toward the end of the shade roller, in order to hold the roller firmly in position, and also to prevent endwise movement of the roller.

In Fig. 5, the shank 4 of one bracket is provided with lugs pressed therefrom, which lugs 13 engage openings 14 of the plate as shown. The shank of the other bracket is provided with lugs 16 pressed therefrom, to engage the depressions 17 formed by constructing the lugs of the other shank, that is, when one shank overlaps the other, and in this case the U-shaped lever is thrown so that its eccentric projections bear and frictionally engage the shank with the lug 16 thereby holding said shank in position, which in turn overlaps and holds the other shank in place.

In the construction shown in Figs. 5 and 6, the brackets may be provided with openings or apertures 18 to receive screws to more securely hold the bracket in place.

The invention having been set forth, what is claimed as new and useful is:—

1. In combination, a plate to be secured to a window frame and provided with struck up lugs adjacent one end and extending toward each other, a shade roller bracket having a shank engaging between said lugs and the plate, said plate adjacent its other end having struck up laterally extending ears between which said shank engages, a U-shaped lever having laterally extending pintles fulcrumed in said ears and provided with eccentric projections adjacent said pintles acting to cam and frictionally engage against said shank, to hold the shank in place, and draw the bracket toward the roller when the lever is thrown into clamping position.

2. In combination, a plate to be secured to a window frame, said plate having adjacent one end struck up lugs extending toward each other, a shade roller bracket having a shank to engage between the lugs and the plate, said shank and plate having inter-engaging lugs and openings to assist in holding the shank in position, said plate adjacent its other end having struck up ears extending laterally, a second shade roller bracket having a shank engaging between the ears, the shanks of both brackets having inter-engaging lugs and depressions to interlock the shanks, and a U-shaped lever having pintles engaging bearings of the ears and provided with eccentric projections to cam and frictionally engage against the shank of the second bracket when the lever is thrown to locking position to clamp both brackets in place.

3. In combination, a plate to be secured to a window frame, said plate having adjacent one end struck up lugs extending toward each other, a shade roller bracket having a shank to engage between the lugs and the plate, said shank and plate having inter-engaging lugs and openings to assist in holding the shank in position, said plate adjacent its other end having struck up ears extending laterally, a second shade roller bracket having a shank engaging between the ears, the shanks of both brackets having inter-engaging lugs and depressions to interlock the shanks, and a U-shaped lever having pintles engaging bearings of the ears and provided with eccentric projections to bite frictionally against the shank of the second bracket to bring the shank toward the shank of the first bracket, whereby the interengaging lugs and depressions of the overlapping shank and the plate may be brought into engagement to clamp both brackets in place.

In testimony whereof we have signed our names to this specification in the presence of two subscribing witnesses.

FRANK J. HOFFELT.
MICHEL HOFFELT.

Witnesses:
BERT B. POWELL,
JOHN J. BLACK.